(12) United States Patent
Schmidt et al.

(10) Patent No.: US 7,906,468 B2
(45) Date of Patent: *Mar. 15, 2011

(54) ACRYLIC BLOCK COPOLYMER LOW TEMPERATURE FLOW MODIFIERS IN LUBRICATING OILS

(75) Inventors: Scott Schmidt, West Chester, PA (US); Peter Callais, Collegeville, PA (US); Noah Macy, Royersford, PA (US)

(73) Assignee: Arkema Inc., Philadelphia, PA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 11/346,674

(22) Filed: Feb. 3, 2006

(65) Prior Publication Data
US 2006/0185903 A1    Aug. 24, 2006

Related U.S. Application Data

(60) Provisional application No. 60/655,352, filed on Feb. 23, 2005.

(51) Int. Cl.
*C10M 145/14* (2006.01)
*C10M 159/12* (2006.01)
*C08F 120/18* (2006.01)

(52) U.S. Cl. ............. 508/469; 508/459; 526/318.3; 526/329.7

(58) Field of Classification Search ............ 508/469, 508/459; 526/318.3, 329.7
See application file for complete search history.

(56) References Cited

U.S. PATENT DOCUMENTS

| | | | |
|---|---|---|---|
| 3,816,314 A * | 6/1974 | Pappas et al. | 508/470 |
| 5,002,676 A | 3/1991 | Willis et al. | |
| 6,255,402 B1 | 7/2001 | Boutillier et al. | |
| 6,255,448 B1 | 7/2001 | Grimaldi et al. | |
| 6,303,550 B1 | 10/2001 | Wedlock et al. | |
| 6,350,723 B1 | 2/2002 | Mishra et al. | |
| 6,531,547 B1 * | 3/2003 | Visger et al. | 525/244 |
| 6,624,322 B1 | 9/2003 | Gillet et al. | |
| 6,632,906 B1 * | 10/2003 | Kamiyama | 526/316 |
| 6,665,043 B1 | 12/2003 | Okuyama et al. | |
| 7,456,138 B2 * | 11/2008 | Sherman et al. | 508/579 |
| 2001/0008928 A1 | 7/2001 | Nesvadba et al. | |
| 2002/0040117 A1 | 4/2002 | Guerret et al. | |

(Continued)

FOREIGN PATENT DOCUMENTS

CA    2392727    11/2000

(Continued)

OTHER PUBLICATIONS

Anachenko, et al, "Decomposition of Model Alkoxyamines in Simple and Polymerizing Systems. II. Diasteroeomeric N-(2-Methylpropyl)-N-(1-diethyl-phosphono-2, 2-dimethylpropyl)-aminoxyl-Based Compounds," Journal of Polymer Science: Part A: Polymer Chemistry, vol. 40, pp. 3264-3283.

(Continued)

*Primary Examiner* — Glenn Caldarola
*Assistant Examiner* — Jim Goloboy
(74) *Attorney, Agent, or Firm* — Steven D. Boyd

(57) ABSTRACT

The present invention relates to acrylic block copolymers synthesized by a controlled free-radical process, and their use as low temperature flow modifiers in oil-based compositions. They are especially useful in modifying the low temperature flow behavior in lubricating oils. The acrylic copolymers are especially useful as pour point depressants in lubricating oil.

7 Claims, 3 Drawing Sheets

U.S. PATENT DOCUMENTS

2005/0107577 A1    5/2005    Couturier et al.
2006/0189490 A1    8/2006    Dardin et al.
2007/0082827 A1*   4/2007    Schmidt et al. ............... 508/469

FOREIGN PATENT DOCUMENTS

EP           0 945 474 B1    3/1999
WO    WO 2005/056739    6/2005

OTHER PUBLICATIONS

Krzystof Matjaszewski, "Comparison and Classification of Controlled/Living Radical Polymerizations," American Chemical Society, Washington, DC, 2000 (ACS Symposium Series 768), pp. 2-26.

T. Fukada and A. Goto, "Kinetic Study on Nitroxice-Mediated Free Radical Polymerization of tert-Butyl Acrylate," Macromolecules 1999, 32, pp. 618-623.

D. Benoit et al, "Controlled Free-Radical Polymerization in The Presence of a Novel Asymmetric Nitroxyl Radical," Polym. Prep. 1997, 38, pp. 729-730.

C. J. Hawker, et al, "Development of a Universal Alkoxyamine for Living Free Radical Polymerizations Using Combinatorial Techniques", Polym. mater. Sci. eng., 1999, 80, pp. 90-91.

C. J. Hawker, "Macromolecures", 1996, 29, pp. 5245-5254.

* cited by examiner

Viscosity and Gelation Plot
Formulated SAE 10W-30 Engine Oil

Viscosity and Gelation Index
0.5% Arkema 50 in Commercial 10W-30 Oil

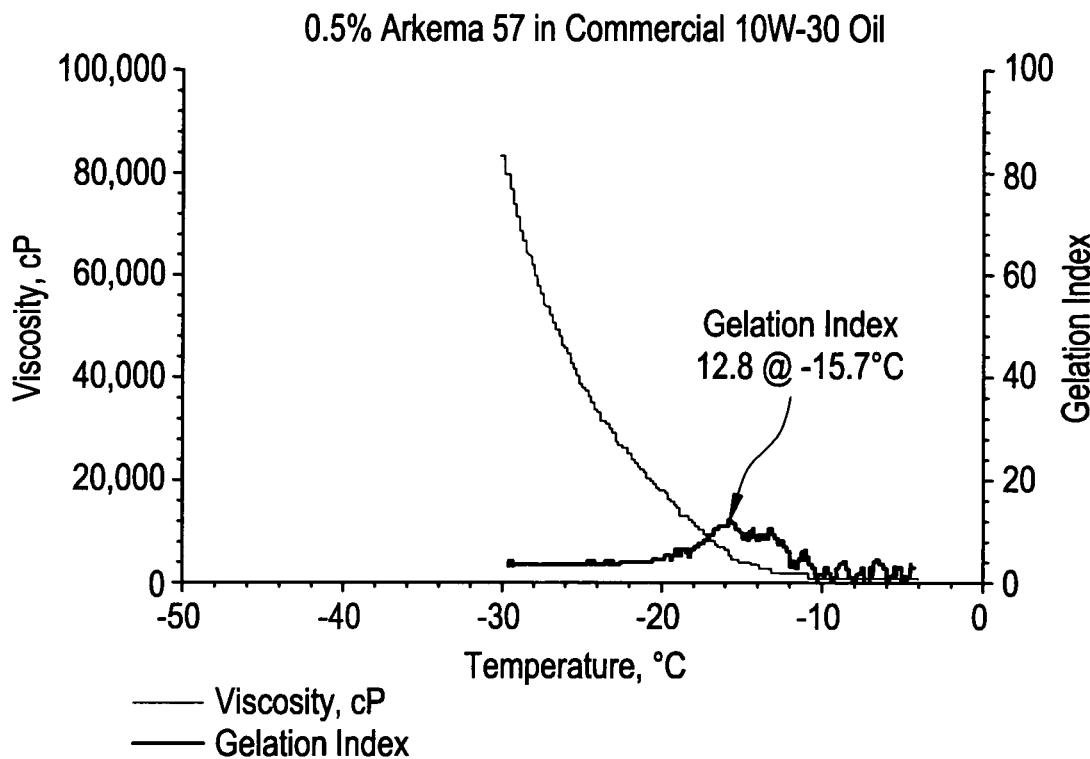
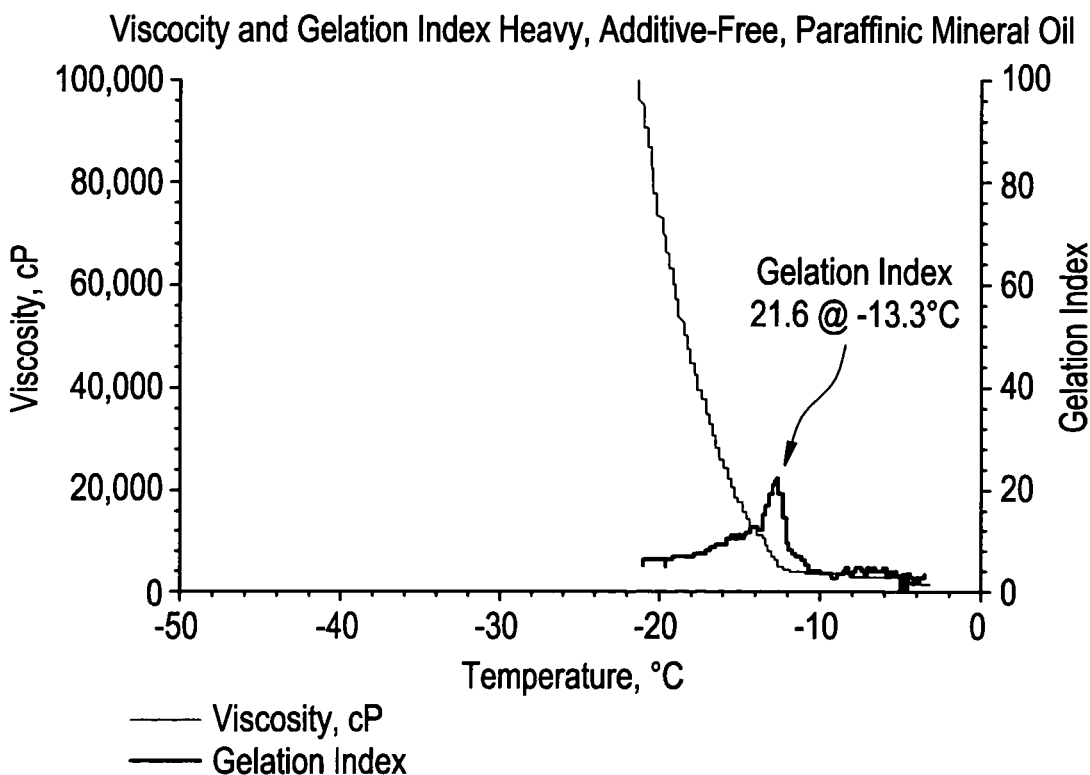

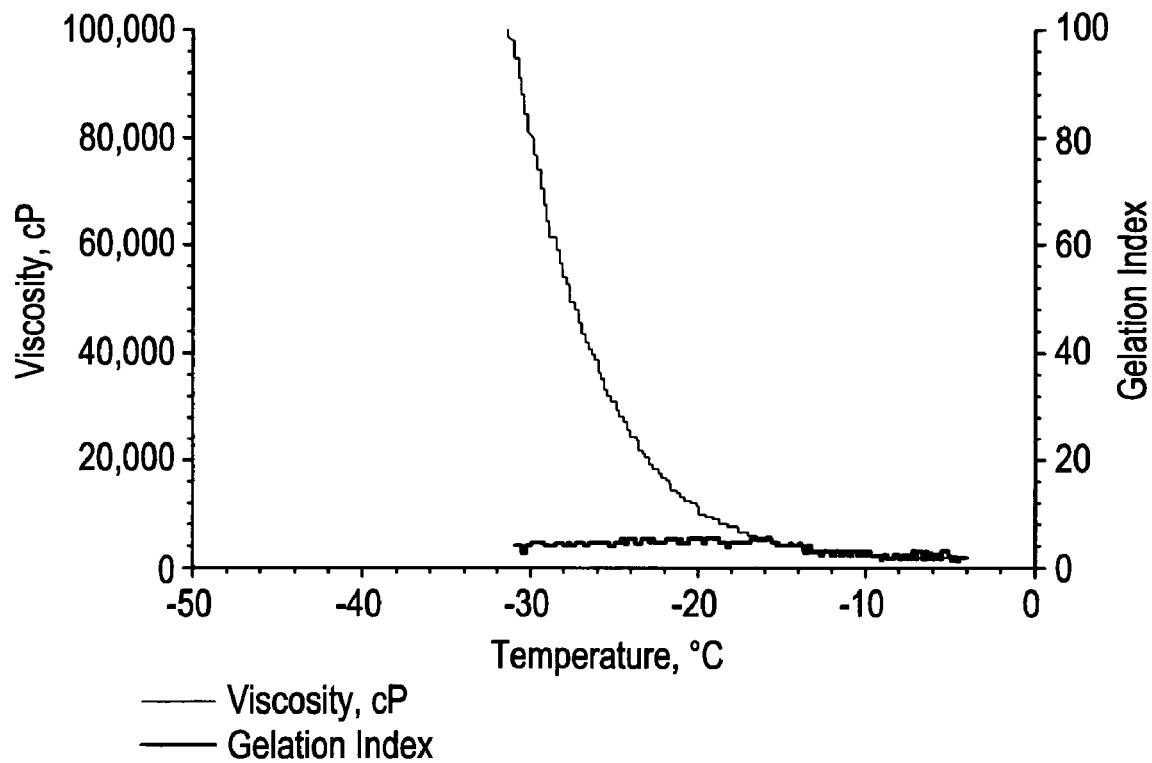

ACRYLIC BLOCK COPOLYMER LOW TEMPERATURE FLOW MODIFIERS IN LUBRICATING OILS

REFERENCE TO RELATED APPLICATION

This application claims the benefit of U.S. Provisional Application Ser. No. 60/655,352, filed Feb. 23, 2005.

FIELD OF INVENTION

The present invention relates to acrylic block copolymers synthesized by a controlled free radical process, and their use as additives and viscosity modifiers in oil-based compositions. They are especially useful in modifying the low temperature flow behavior in lubricating oils. They are particularly useful as pour point depressants.

BACKGROUND OF THE INVENTION

Lubricating oils, such as motor oils, gear oils, hydraulic fluids and transmission fluids typically contain several additives to improve their performance. These can include dispersants, antioxidants, detergents, friction modifiers, de-foaming agents, viscosity index improvers, and pour point depressants.

Lubricants, especially those oils obtained from petroleum via distillation, generally contain long-chain n-alkanes, which are known to precipitate out in crystalline form upon cooling. The presence of these waxy paraffins significantly reduces the fluidity of the oils at low temperature conditions. The crystallization or precipitation of the paraffin components can have an adverse effect on the flow of the lubricating oil or even completely prevent flow. An improvement in the pour point (the lowest temperature at which point the formulated oil remains fluid) of a lubricant can be achieved by partial dewaxing, and then this pour point can be further lowered by the addition of polymeric flow improvers called pour point depressants or pour point improvers. These pour point depressants are effective at low concentrations, for example in the 0.05 to 1 weight percent range in the oil.

The exact mechanism by which these polymers function is not straightforward but it is presumed the paraffin-like polymers become incorporated into the growing paraffin crystal structure and disrupt further crystal growth. This disruption prevents the formation of extended crystal agglomerates thus allowing the oil to remain fluid at lower temperatures than possible in the absence of these compounds. Certain facets of a polymers structure are known to impart pour point depressant activity. For example, polymers with long alkyl side chains are known to exhibit a pour point and flow improving effect as the alkyl groups are able to disrupt crystal growth (see Ullman's Encyclopedia of Industrial Chemistry, $4^{th}$ Edition, Volume 20, Verlag Chemie, 1981, p548). Other desired properties in commercial pour point depressant polymers include, good thermal, oxidative, and chemical stability, shear strength, etc.

Obtaining suitable low temperature performance has become even more difficult recently with the movement away from API Group I base oils and the increased utilization of Group II and Group III base oils. Further, refiners who blend with different base oils desire a single product, which performs effectively in all of these different base oils. The present invention is directed to novel, controlled acrylic copolymers, which exhibit excellent low temperature performance in a wide variety of base oils.

Random copolymers are used to a wide extent as pour point depressants. One prevalent class of materials is polymethacrylates (PMA's) that contain long chain alkyl residues. These compounds are described, for example, in U.S. Pat. Nos. 2,091,627, 2,100,993, 2,114,233 and EP-A-0 236 844. In general, these pour point depressants are produced by radical polymerization. To ensure solubility in a lubricating oil base, these copolymers typically contain high levels of a monomer or monomers whose homopolymer is oil-soluble.

Polymers having a controlled architecture, including star copolymers (EP 1064347) and block copolymers have been described in the art. These polymers can be prepared through a variety of living anionic and living (or controlled) free radical polymerization techniques. These techniques have been used primarily to control the molecular weight distribution.

U.S. Pat. No. 6,538,091 describes a process for controlling a polymer architecture using an atom transfer process (ATRP) based on a redox reaction with a transition metal compound. This process uses an initiating system resulting in a copolymer having a predictable molecular weight and allows for some control over polydispersity. Polymers made by the process are described as useful for molding materials, barrier materials, thermoplastic elastomers, and amphiphilic surfactants. This controlled radical polymerization technique has several drawbacks such as, residual metallic by-products which can be detrimental to many applications (for example see U.S. Pat. No. 6,610,802) and limitations in polymer composition.

Random copolymers made by ATRP have been used as pour point depressants (U.S. Pat. No. 6,391,996), and viscosity index improvers (US2002/0188081). The '996 patent mentions that the ATRP process could be used for blocky copolymers, but it fails to exemplify such a use, or disclose the PPD benefit of using such block copolymers in lubricating oils. Also, U.S. Pat. No. 6,403,745 discloses gradient copolymers synthesized by ATRP useful as pour point depressants. U.S. Pat. No. 6,403,745 discloses gradient copolymers, not block copolymers. Gradient polymer structures are random copolymers that rely on monomer feed rates to obtain a gradient structure with the controlled nature of the polymerization providing homogeneity of composition across all the polymer chains (polymers formed by traditional methods contain a statistical mixture of copolymers).

The controlled polymers disclosed in U.S. Pat. Nos. 6,391, 996 6,403,745 refer to the use of initiators having a transferable atomic group and a catalyst containing a transition metal (ATRP techniques). These types of polymerizations have several drawbacks including, but not limited to, slow polymerization kinetics, residual metallic byproducts, and limited polymer composition and molecular weight ranges. The metallic by-products are detrimental in engine-type lubricant applications and require removal, which is difficult and requires laborious procedures. U.S. Pat. No. 6,610,802 describes these byproducts and discloses the disadvantage of ATRP processes. The residual metal catalysts can be detrimental for many applications as they influence the product properties and impact environmental compatibility.

Block copolymers have also been shown to be useful as viscosity index improvers (VIIs). Block copolymers of a vinyl aromatic monomer and a vinyl aromatic-co-acrylic block prepared by stabilized free radical polymerization are described in patents EP 0 945 474, and U.S. Pat. No. 6,531, 547. These patents describe the use of TEMPO-based nitroxide derivatives for the synthesis of the corresponding block copolymers. It is well known that this class of free radical control agent does not provide control over acrylic type monomers. Specifically, the use of methacrylics will lead to side and termination reactions such as disproportionation, which inhibits the formation of block copolymers and long chain molecules (as described by Ananchenko et. al. in the *Journal of Polymer Science: Part A: Polymer Chemistry*, Vol. 40 pp 3264-3283). Also, block copolymers of ethylene and alpha-olefins have been described in US 2003/0073785 and block copolymers of poly(conjugated dienes) and poly (monovinyl aromatic hydrocarbons have been described in U.S. Pat. No. 6,303,550. These references do not disclose the use of a controlled architecture copolymer having at least one pure acrylic block segment for use as a VII.

U.S. Pat. No. 5,002,676 describes the preparation of block copolymers containing selectively hydrogenated conjugated dienes and t-butyl methacrylate. U.S. Pat. No. 6,350,723 teaches the synthesis of block copolymers through the living anionic polymerization of a conjugated diene and an alkyl methacylate monomer. These references exemplify the use of block copolymers containing conjugated dienes and hydrogenated dienes. Also these reports do not teach the significance of tailoring block composition or allow for the formation of gradient compositions. Furthermore, living anionic polymerization suffers from several drawbacks, such as, ineffectiveness at temperatures above −20° C., poor copolymerization between polar and non-polar comonomers, and the inability to use monomers that can be easily deprotanated. Therefore functional monomers cannot be incorporated, and the copolymerization of monomer mixtures can be problematic and/or unusable. Furthermore this process can be expensive and difficult or impractical to carry out on an industrial scale as bulk or emulsion techniques cannot be used, extremely pure reagents are necessary (even trace amounts of protic material inhibits polymerization), and an inert atmosphere is requisite.

A process for preparing copolymers in the presence of a stable free radical from the nitroxide family is described in U.S. Pat. No. 6,255,402. Nitroxide-mediated stable radicals have been used to produce controlled block copolymers, as described in U.S. Pat. No. 6,255,448, US 2002/0040117, and US Published Application No. 2005/0107577. These references, incorporated herein by reference, do not disclose the use of the copolymers in lubricating oils.

SUMMARY OF THE INVENTION

Surprisingly it has now been found that acrylic block copolymers formed by a controlled-radical polymerization method, are excellent at modifying the low temperature flow behavior in lubricating oils, including, but not limited to lowering the pour point. The polymers of the invention produce a greater reduction of the pour point than found in random copolymers. While the properties attained in traditional copolymers are typically an average of the properties imparted by the resultant monomers incorporated, block copolymers lead to a material containing the characteristic properties inherent to the parent homopolymers comprising each segment. Therefore, the use of block copolymers is particularly adventitious for the formation of materials containing multifunctional properties. Furthermore, these polymers should provide enhanced shear stability due to the controlled molecular weights and molecular weight distribution provided by the controlled polymerization process. The viscosity modifying advantages of these copolymers for lubricant oil applications can be exemplified by the excellent performance demonstrated in traditionally used test methods for low temperature properties, such as ASTM D-97 (pour point), ASTM D-4684 (minirotary viscosimetry) and ASTM D-5133 (scanning Brookfield).

It is an objective of the invention to provide a controlled-architecture copolymer capable of improving the low temperature flow behavior of oil-based compositions.

Another objective of the invention is to provide a lubricating oil with low temperature flow improvement by utilizing an acrylic block copolymer.

Another objective of the invention is to provide a lubricating oil with low temperature flow improvement by utilizing an acrylic block copolymer prepared via controlled radical polymerization (CRP) techniques.

It is a further objective of the invention to adjust the copolymer composition and physical properties of a controlled-radical copolymer for the optimal low temperature flow improvement in a given lubricating oil.

It is also an objective of the invention to synthesize an acrylic block copolymer by a nitroxide-mediated polymerization process.

It is still a further objective of the invention to provide an acrylic block copolymer having multifunctional properties such as improved shear stability, pour point depression, dispersant, etc.

These objectives have been met in a lubricating oil composition comprising:
a) from 99.999 to 30.0 weight percent of one or more oils, and
b) from 0.001 to 70.0 weight percent of a controlled architecture block copolymer having at least one acrylic block.

BRIEF DESCRIPTION OF THE DRAWINGS

FIG. 3 graphically illustrates the viscosity and gelation point for a formulated SAE 10W-30 engine oil treated with 0.5% of polymer 57 in accordance with the present invention.

FIG. 4 graphically illustrates the viscosity and gelation point for a heavy, additive free, parafinnic mineral oil exhibiting a poor low temperature gelation and viscosity profile.

FIG. 5 graphically illustrates the viscosity and gelation point for a heavy, additive free, parafinnic mineral oil treated with 0.5% of polymer 57 in accordance with the present invention.

DETAILED DESCRIPTION OF THE INVENTION

Figure 1:
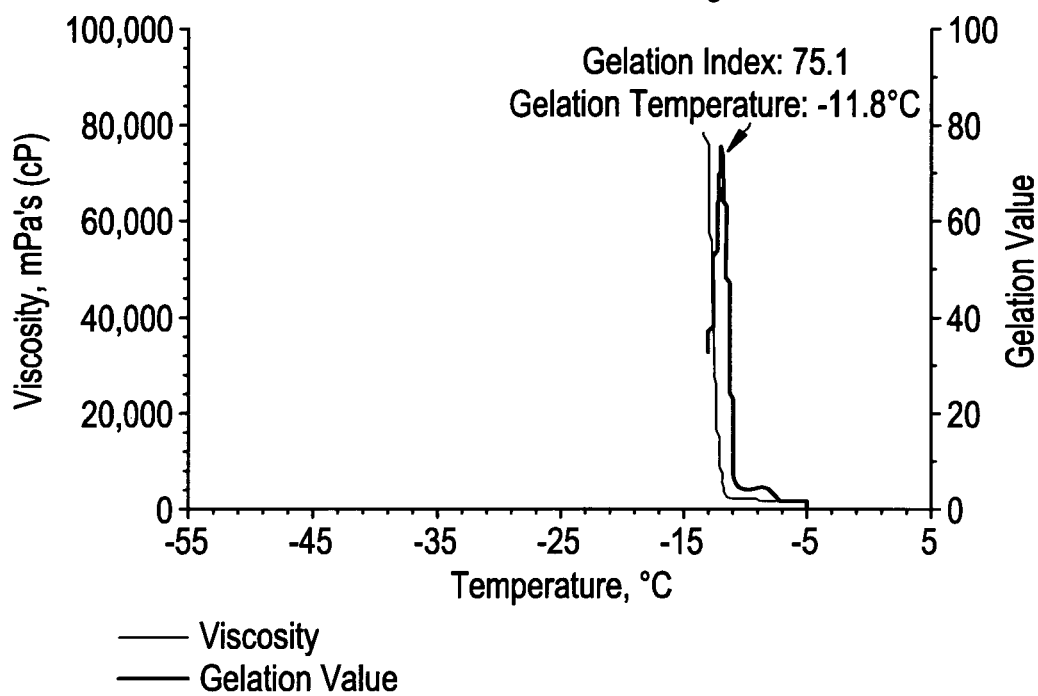
FIG. 1 graphically illustrates the viscosity and gelation point for a formulated SAE 10W-30 engine oil exhibiting poor low temperature gelation and viscosity profile.

The present invention is directed to novel, controlled acrylic copolymers, which exhibit excellent low temperature performance in a wide variety of base oils. Furthermore, the specific composition of the corresponding block copolymers can be tailored accordingly based on the base oil utilized to attain the desired low temperature flow modification behavior.

The block copolymers of the present invention find use, among other things, as modifying the low temperature flow behavior of oil-based formulations. Oils useful in the invention include, but are not limited to, mineral oils, synthetic oils, silicon oils, and lubricating oils. In one preferred case, these block copolymers may be solubilized in base oils to form a lubricating oil composition. The oil makes up from 60 to 99.999 percent by weight of the oil composition, preferably from 80 to 99.99 percent.

By "copolymers" as used herein, is meant polymers formed from at least two chemically distinct monomers as will be evident to those skilled in the art. The copolymer includes terpolymers and those polymers formed from more than three monomers.

Block copolymers of the present invention are those formed by controlled radical polymerization (CRP). They differ from random copolymers that may contain some blocks of certain monomers related either to a statistical distribution, or to the differences in reaction rates between the monomers. In these random polymerizations, there is no control over the polymer architecture, molecular weight, or polydispersity and the relative composition of the individual polymer chains is non-uniform. Included as block copolymers of the present invention are diblock copolymers, triblock copolymers, multiblock copolymers, star polymers, comb polymers, gradient polymers, and other polymers having a blocky structure, which will be known by those skilled in the art. Furthermore, each block segment may consist of a pure homopolymer segment (one monomer), or may be a copolymer of two or more different monomers.

When a copolymer segment is synthesized using a CRP technique such as nitroxide-mediated polymerization, it is termed a gradient or 'profiled' copolymer. This type of copolymer is different than a polymer obtained by a traditional free radical process and will be dependant on the monomer composition, control agent, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization, thus the composition is uniform and is dependant on the corresponding monomer mix with respect to the reaction time. Thus in a two monomer system where one monomer reacts faster than the other, the distribution or 'profile' of the monomer units will be such that one monomer unit is higher in concentration at one end of the polymer segment. Block copolymers of this invention may contain a block that is a gradient copolymer.

The copolymers of the invention are acrylic block copolymers. By acrylic block copolymer, as used herein, is meant that at least one block of the copolymer is formed entirely or almost entirely from one or more acrylic monomers. The acrylic block contains at least 51 mole percent of acrylic monomer units and preferably at least 90 mole percent. In one preferred embodiment, the acrylic block contains 100 percent acrylic monomer units. The other block or blocks may be acrylic or non-acrylic.

By "acrylic" as used herein is meant polymers or copolymers formed from acrylic monomers including, but not limited to, acrylic acids, esters of acrylic acids, acrylic amides, and acrylonitiles. It also includes alkacryl derivatives, and especially methacryl derivative. The use of the term "(meth) acylates" herein will be used to describe both esters of acrylic acid and methacrylic acid as will be evident to those skilled in the art. Functional and fluorinated (meth)acrylate monomers are also included. Examples of useful acrylic monomers include, but are not limited to acrylic acid; methacrylic acid; alkyl esters and mixed esters of (meth)acrylic acid; acrylamide, methacrylamide, N- and N,N-substituted (meth)acrylamides, acrylonitrile, maleic acid, fumaric acid, crotonic acid, itaconic acid and their corresponding anhydrides, carbonyl halides, amides, amidic acids, amidic esters, and the full and partial esters thereof. Especially preferred acrylic monomers include methyl acrylate, ethyl acrylate, butyl acrylate, and $C_6$-$C_{30}$ alkyl (meth)acrylates, and mixtures thereof.

The other block or blocks of the copolymer may be acrylic, or formed from one or more non-acrylic ethylenically unsaturated monomers. Other ethylenically unsaturated monomers useful in the invention include, but are not limited to, anhydrides, vinyl esters, alpha-olefins, substituted or unsubstituted mono and dialkyl esters of unsaturated dicarboxylic acids, vinyl aromatics, cyclic monomers, monomers containing alkoxylated side chains, sulfonated monomers, dienes, and vinyl amide monomers. Acrylic monomers may also be used at any level. A combination of ethylenically unsaturated monomers may also be used. In one preferred embodiment all blocks of the copolymer are acrylic blocks.

In principle, any living or controlled polymerization technique can be utilized. However, for the practicality of controlling acrylics, and creating copolymer segments of different polarities (including functional acrylics) the block copolymers of the present invention are preferably formed by controlled radical polymerization (CRP).

These processes generally combine a free-radical initiator species with a free radical stabilizing compound to control the polymerization process and produce polymers of a specific composition, and having a controlled molecular weight and narrow molecular weight range.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, NMP, and RAFT*, edited by Krzystof Matyjaszewski, American Chemical Society, Washington, D.C., 2000.

One preferred method of controlled radical polymerization is nitroxide-mediated CRP. Nitroxide-mediated syntheses can occur in bulk, solvent, and aqueous polymerization, can be used in existing equipment at reaction times and temperature similar to other free radical polymerizations. One advantage of nitroxide-mediated CRP is that the nitroxide is generally innocuous and can remain in the reaction mix, while other CRP techniques require the removal of the control compounds from the final polymer.

The mechanism for this control may be represented diagrammatically as below:

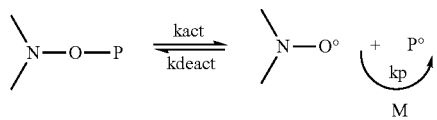

with M representing a polymerizable monomer and P representing the growing polymer chain.

The key to the control is associated with the constants $K_{deact}$, $k_{act}$ and $k_p$ (T. Fukuda and A. Goto, Macromolecules 1999, 32, pages 618 to 623). If the ratio $k_{deact}/k_{act}$ is too high, the polymerization is blocked, whereas when the ratio $k_p/k_{deact}$ is too high or when the ratio $k_{deact}/k_{act}$ is too low though, the polymerization is uncontrolled.

It has been found (P. Tordo et al., Polym. Prep. 1997, 38, pages 729 and 730; and C. J. Hawker et al., Polym. mater. Sci. Eng., 1999, 80, pages 90 and 91) that β-substituted alkoxyamines make it possible to initiate and control efficiently the polymerization of several types of monomers, whereas TEMPO-based alkoxyamines [such as (2',2',6',6'-tetramethyl-1'-piperidyloxy-)methylbenzene mentioned in Macromolecules 1996, 29, pages 5245-5254] control only the polymerizations of styrene and styrenic derivatives. TEMPO and TEMPO-based alkoxyamines are not suited to the controlled polymerization of acrylics.

The nitroxide-mediated CRP process is described in, U.S. Pat. Nos. 6,255,448 and 6,665,043, US 2002/0040117, and US Published Application No. 2005/0107577, incorporated herein by reference. The above-stated patents describe the nitroxide-mediated polymerization by a variety of processes. Each of these processes can be used to synthesize polymers described in the present invention.

In one process the free radical polymerization or copolymerization is carried-out under the usual conditions for the monomer or monomers under consideration, as known to those skilled in the art, with the difference being that a β-substituted stable free radical is added to the mixture. Depending on the monomer or monomers which it is desired to polymerize, it may be necessary to introduce a traditional free radical initiator into the polymerization mixture as will be evident to those skilled in the art.

Another process describes the polymerization of the monomer or monomers under consideration using a alkoxyamine obtained from β-substituted nitroxides of formula (I) wherein A represents a mono -or polyvalent structure and $R_L$ represents a mole weight of more than 15 and is a monovalent radical, and $n \geq 1$.

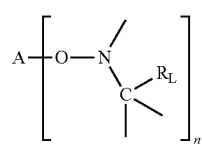

(I)

Another process describes the formation of polyvalent alkoxyamines of formula (I), based on the reaction of multifunctional monomers, such as, but not limited to, acrylate monomers and alkoxyamines at controlled temperatures. The multifunctional alkoxyamines of formula (I), wherein $n \geq 2$, may then be utilized to synthesize multiblock, star and branched polymeric and copolymeric materials from the monomer or monomers under consideration.

Another process describes the preparation of multimodal polymers where at least one of the monomers under consideration is subjected to free radical polymerization in the presence of several alkoxyamines comprising the sequence of formula (I), wherein n is a non-zero integer and the alkoxyamines exhibit different values of n.

The alkoxyamines and nitroxyls (which nitroxyls may also be prepared by known methods separately from the corresponding alkoxyamine) as described above are well known in the art. Their synthesis is described for example in U.S. Pat. No. 6,255,448 and WO 00/40526.

In some embodiments of the invention, the alkoxyamine is one which produces the N-tert-butyl-N-[1-diethylphosphono-(2,2-dimethylpropyl)]nitroxide (DEPN) radical shown in formula II. One particularly effective class of nitroxide sources includes compounds such as iBA-DEPN, shown below in formula III, where the DEPN radical is linked to an isobutyric acid radical or an ester or amide thereof. If esters or amides are used, they are preferably derived from lower alkyl alcohols or amines, respectively.

DEPN Nitroxide:

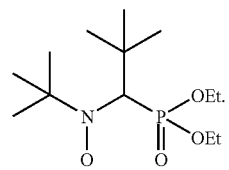

(II)

iBA-DEPN Alkoxyamine:

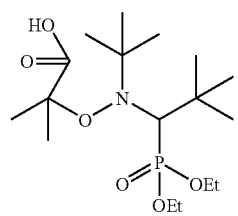

(III)

The alkoxyamines of formula (I) according to the present invention may be used for the polymerization and copolymerization of any monomer containing a carbon-carbon double bond, which is capable of undergoing free-radical polymerization. The control over these reactions will be dictated by the kinetic parameters described earlier. The polymerization or copolymerization is performed under the usual conditions known to those skilled in the art, taking into account the monomer(s) under consideration. Thus, the polymerization or copolymerization may be performed in bulk, in solution, in emulsion or in suspension, at temperatures ranging from 0° C. to 250° C. and preferably ranging from 25° C. to 150° C., without any limitation intended by this. Monomers which may be used according to the present invention, mention will be made of vinylaromatic monomers such as styrene, substituted styrenes, dienes, acrylic monomers such as alkyl or aryl acrylates and methacrylates, optionally containing fluorine, for instance methyl acrylate, butyl acrylate, octyl acrylate, lauryl acrylate, or lauryl methacrylate, and acrylamides such as N,N-dimethylacrylamide. This method works especially well for styrenics, acrylates, acrylamides, methacrylates and dienes. Monomers containing functional groups, such as epoxy, hydroxyl, and acid monomers are also easily polymerized by this method.

The alkoxyamines (I) according to the present invention may also be used for the synthesis of "sequenced" block copolymers according to a procedure which consists in carrying out, in a first step, the bulk, solution, suspension or emulsion polymerization of a monomer M1 or a mixture of monomers containing a carbon-carbon double bond capable of undergoing free-radical polymerization in the presence of a alkoxyamine (I) at a temperature ranging from 25° C. to 250° C. and preferably ranging from 25° C. to 150° C., and then, in a second step, allowing the temperature to fall and optionally evaporating off the residual monomer(s), and then, in a third step, introducing the monomer M2 or a new mixture of monomers into the reaction medium obtained above, and then resuming the polymerization by simply raising the temperature.

Polymers made by the nitroxide-mediated process will have some level of nitroxide end groups and the A group from Formula I at the other end or in the center of the corresponding block. These relatively innocuous nitroxide end-groups can remain on the end of the polymer chains or be removed by an additional processing step.

The nitroxide-mediated polymerization may be used to form block copolymers, which of the present invention are diblock copolymers, triblock copolymers, multiblock copolymers, star polymers, comb polymers, gradient polymers, and other polymers having a blocky structure, which will be known by those skilled in the art. The multiblock and triblock copolymers may consist of two chemically discrete segments, such as in A-B-A triblocks or multiblocks of the formula $(A-B)_n$, where n is >1 and A and B represent chemically distinct block segments. Or they may contain 3 or more chemically distinct blocks, such as A-B-C triblocks or A-B-C-D multiblock copolymers. The star polymers may contain from 3 to 12 arms, more preferably 3 to 8 and these arms may consist of or diblock, triblock, or multiblock copolymers. These aforementioned structures will be evident to those skilled in the art. Each block segment defined above may consist of a homopolymer, a random copolymer or may be comprised as a gradient copolymer of two or more different monomers.

The block copolymers of the present invention have a controlled molecular weight and molecular weight distribution. Preferably the molecular weight of the copolymer is from 1,000 to 1,000,000 g/mol, and most preferably from 5,000 to 300,000 g/mol. The molecular weight distribution, as measured by $M_w/M_n$ or polydispersity is generally less than 4.0, and preferably below 3.0.

The block copolymers may also be produced in tandem with traditional free radical processes. For example, during a controlled polymerization, a traditional free radical source can be added to the reaction creating a mixture of controlled and non-controlled polymers. These free radical sources will be those known in the art, including but not limited to, peroxy compounds, peroxides, hydroperoxides and azo compounds, which decompose thermally to provide free radicals.

One embodiment of the invention is a lubricating oil composition containing acrylic block copolymers with improved low temperature flow properties. These polymers will be useful as pour point depressants. Uses of such lubricating oils include, but are not limited to motor oils, gear oils, pump oils, turbine oils, hydraulic fluids, cutting fluids and transmission fluids. The block copolymers may be used independently, or as a blend with traditional polymers. In the lubricating oil composition, a variety of additives may also be present in addition the base oil and polymers mentioned above, including but not limited to detergents, anti-foaming agents, viscosity index improvers, and anti-corrosion agents.

Due to the control over molecular weight and narrow molecular weight distribution, these polymers exhibit enhanced shear stability. The use of long chain alkyl (meth) acrylates will allow for improved low temperature properties. These low temperature properties will be evident in SAE J300 Standard viscosity tests, such as cold cranking simulator viscosity (ASTM D5293), scanning Brookfield viscosity (ASTM D 5133), pour point (ASTM D97) and mini-rotary viscosity (ASTM D4684).

The block copolymer is present in a lubricating oil composition at from 0.001 to 40.0 percent by weight, and preferably from 0.01 to 20.0. The level of copolymer used will depend on the end-use location, application, and the base oils utilized. Excellent low temperature flow property improvement has been found using the acrylic copolymers of the present invention.

Because of the large low temperature flow improvement of these copolymers, oils having superior flow can be formulated at similar copolymer levels to those currently used, or flow improvement similar to that of currently used flow modifiers can be achieved at lower levels of the copolymer of the invention. While not being bound by any particular theory, it is believed that the blocky nature of the present copolymers leads to the large low temperature flow improvement.

The lubricating oils of the present invention can be optimized based on several characteristics of the copolymers, including but not limited to, polymer molecular weight, block lengths, proper selection of monomer or monomer mixture in each segment, and polymer chain architecture.

The oil composition of the invention is useful in applications including hydraulic and transmission fluids, gear and motor oils. The block copolymers may be preferentially used as pour point depressants.

EXAMPLES

The controlled architecture block copolymers were synthesized using the following generic protocol. Molecular weights were targeted by manipulating the monomer-to-initiator concentration ([M]/[I]). Therefore a targeted molecular weight could be achieved by setting the [M]/[I] ratio, and then carrying out the polymerization to the desired conversion necessary to reach the target molecular weight. Monomer conversion was conveniently monitored by gas chromatography (GC) analysis or flash devolitization of the monomer under vacuum. The polymer examples were run neat or in solution. Typical solvents used included, toluene, ethyl benzene, butyl acetate, methyl ethyl ketone and directly in lubricating oils. Polymerizations were carried out at ambient pressures or run under nitrogen pressure up to 60 psi. Polymerizations were run in standard polymerization vessels both with and without shearing capacity, although adequate mixing capabilities were preferred.

The target block copolymers were prepared by various traditional monomer addition and polymer isolation protocols, as generically described below and will be evident to those skilled in the art, dependant on the desired final block composition. For example, pure block copolymers were prepared by evaporating or filtering off the residual monomer upon completion of the first block synthesis, subsequently followed by the addition of a second monomer composition different from the first. This second monomer composition then undergoes polymerization. This procedure may be repeated to obtain multiblock copolymers. Gradient block copolymers were synthesized by polymerizing a mixture of two or more monomers. This mixture could result, for instance, by adding a second monomer to the initial polymerization medium prior to evaporation of the residual first monomer, or a multi-monomer mix could be polymerized as a first block, or a multi-monomer mix could be added to an isolated pure first block.

Synthesis of the copolymers of the invention is illustrated by reference to example 1 below. Other copolymers of this invention can be prepared in an analogous manner, as it will be evident to those skilled in the art.

Mono-alkoxyamine Initiator

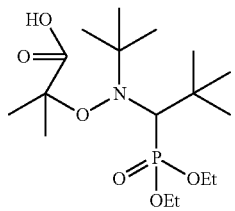

Example 1

Polymer Synthesis

Synthesis of an A-B block copolymer. The A block is polylauryl acrylate (PLA) and the B block is a gradient copolymer of polystearyl methacrylate and polylauryl acrylate (PLA-co-PSMA). For A-B block copolymer:430 g (1.6 mol) of 90% pure lauryl acrylate (LA) (available from Sartomer) was added to a stainless steel resin kettle under nitrogen and brought to 50° C. 2.755 g mono-alkoxyamine initiator (7.22 mmol) was added to the heated lauryl acrylate using 42 g of toluene. The mixture was polymerized at 116-120° C. for 4 hours under nitrogen, reaching 67% conversion of LA monomer.

The reaction is then cooled to room temperature. The resultant PLA first block has a Mw=40,000 g/mol, and Mn=25,900 g/mol as determined by SEC analysis and referenced to polystyrene standards. This was used as a first block solution without further purification.

The second block was a gradient copolymer. To 66.7 g of the mixture above (44 g PLA polymer and 22 g LA monomer), was added 20.0 g of stearyl methacrylate (SMA) monomer and 15 g of toluene. This was then added to a heated 100 ml glass reactor and polymerized at 115° C. for 4 hours, under nitrogen, to form the gradient diblock copolymer (Arkema 57). Several other polymer variations of Arkema 57 were prepared as described below.

1.1) Alternatively, 66.7 g of the PLA first block mixture was added to 5.0 g of SMA with 15 g of toluene and polymerized at 115° C. for 4 hours (Arkema 50).

1.2) Alternately 66.7 g of the mixture was added to 20.0 g of dodecyl methacrylate with 15 g of toluene and polymerized at 114° C. for 4 hours (Arkema 55).

1.3) Alternately, 66.7 g of the mixture was added to 5.152 g of C18-22 acrylate with 15 g of toluene and polymerized at 114° C. for 4 hours. (Arkema 51)

Example 2

PLA-b-PSMA

An analogous A-B block copolymer was prepared in which the A block is polylauryl acrylate (PLA) and the B block is a pure block of polystearyl methacrylate (PSMA). A solvent washing procedure removed the residual monomer from the first block PLA from example 1. The neat PLA was then dissolved in toluene (approximately equal weight) prior to adding to the heated stearyl methacylate monomer solution. This protocol resulted in a pure block copolymer of PLA and PSMA.

Example 3

Mixtures of controlled and traditional non-controlled polymers were also prepared. For instance, following example 1.0 through 1.3, after the 2$^{nd}$ block reaches 60% conversion, a traditional initiator source, Luperox 575, (available from Arkema Inc of Philadelphia, Pa.) was added to the reaction mixture at 2 wt % with respect to residual monomer. The reaction mixture was held at 115° C. for 1-2 hours, leaving the residual monomer at <1 wt %. This step provides a blend of controlled and non-controlled polymers. These polymers were isolated by removing the toluene under vacuum.

Example 4

Testing of Polymers

Figure 2:
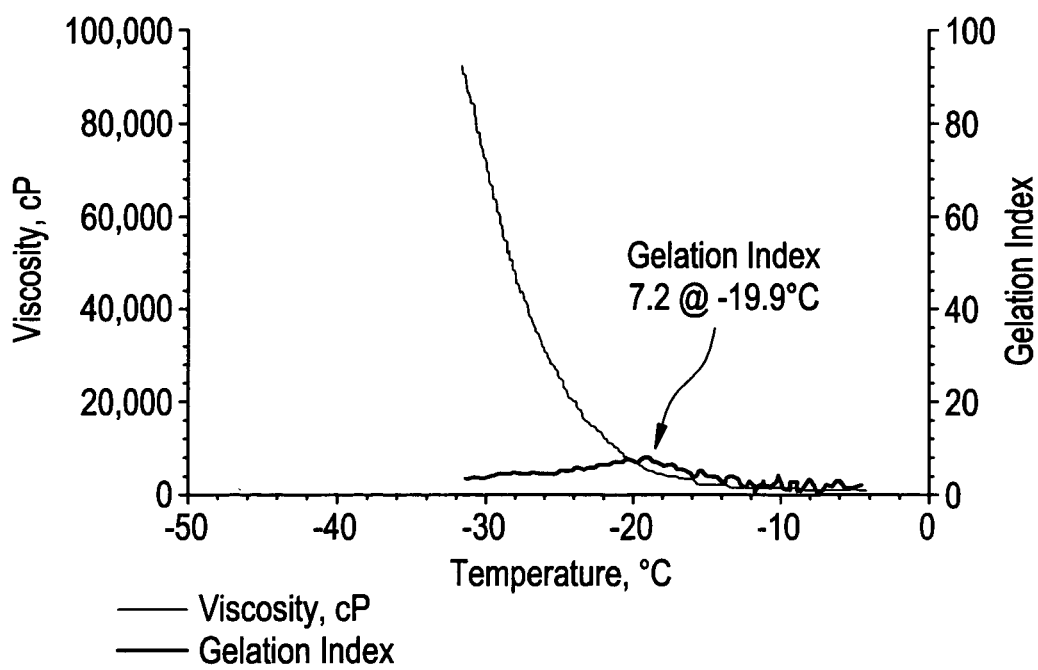
FIG. 2 graphically illustrates the viscosity and gelation point for a formulated SAE 10W-30 engine oil treated with 0.5% of polymer 50 in accordance with the present invention.

Polymers in accordance with the present invention display excellent pour point, shear stability, and low temperature behavior. These characteristics can be quantified through test results from SAE J300 Standard viscosity tests, such as, but not limited to cold cranking simulator viscosity (ASTM D5293), scanning Brookfield viscosity (ASTM D 5133), pour point (ASTM D97) and mini-rotary viscosity (ASTM D4684). Polymers, Arkema 50 and 57 were prepared in accordance with the present invention and added to a formulated SAE 10W-30 engine oil. FIG. 1 shows the viscosity and gelation index curves for the SAE 10W-30 engine oil. FIG. 2 illustrates the pour point depression of the SAE 10W-30 oil when treated with Arkema 50. At 0.5 wt % addition, Arkema 50 decreases the gel point temperature and reduces the low temperature viscosity. FIG. 3 illustrates the pour point depression of the SAE 10W-30 oil when treated with Arkema 57. At 0.5 wt % addition, Arkema 57 decreases the gel point temperature and reduces the low temperature viscosity. FIG. 4 shows the viscosity and gelation index curves for a heavy, additive free, parafinnic mineral oil. FIG. 5 illustrates the pour point depression of the heavy, additive free, parafinnic mineral oil when treated with Arkema 57. At 0.5 wt % addition, Arkema 57 decreases the gel point temperature and reduces the low temperature viscosity. Arkema 50 and 57 are block copolymers in accordance with the present invention.

Example 5

The solution from Examples 1 through 1-3 are diluted with a variety of lubricating oils or lubricating oil mixtures and used directly as pour point depressants. Any residual solvents were removed under vacuum distillation.

Example 6

Starting with a multifunctional alkoxyamine (Formula I where n is greater than or equal to 2) and proceeding with the polymerization procedures described in example 1, star block or triblock copolymers were synthesized. The multifunctional alkoxyamines were formed by adding a slight molar excess (of amino-alkoxyamine to unsaturated groups in the multifunctional acrylate) of a mono-alkoxyamine of Formula I where n=1, to a multifunctional acrylate at 80° C. for approximately 4 hours (ethanol is used as a solvent). The monoalkoxyamine is chosen such that the dissociation temperature is <60° C. Weighed 6.57 g of iBA-DEPN Alkoxyamine, 1.65 g of pentaerythritol tetraacrylate and 4 g of ethanol into a 15 ml pressure tube. Heat tube to 80° C. for 1 hour, then hold at 60° C. for 16 hours. Added the contents of this tube to 70.75 g of butyl acrylate and polymerized for 2 hours at 117° C. (50% conversion). 10 g of this solution was added to 20.07 g of lauryl acrylate and 49.9 g of lauryl methacrylate and the mixture was polymerized at 105° C. for 3 hours. The reaction was then split into two containers and one was reacted with 0.256 g of Luperox575 (available form Arkema Inc. of Philadelphia, Pa.) at 110° C. to remove residual monomer. Both solutions were precipitated from Methanol and the polymer was found to be soluble in mineral oil.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

What is claimed is:

1. An oil composition comprising
   a) from 99.999 to 30 weight percent of one or more oils; and
   b) from 0.001 to 70 weight percent of an acrylic block copolymer, obtained via nitroxide mediated controlled radical polymerization having at least one acrylic block formed from all acrylic monomers;
   wherein said oil composition has a pour point lower than the pour point of said one or more oils alone.

2. The oil composition of claim 1 comprising from 0.01 to 20 weight percent of said acrylic block copolymer.

3. The oil composition of claim 1 wherein said oil composition comprises a lubricating oil.

4. The oil composition of claim 3 where said lubricating oil is a hydraulic fluid, a transmission fluid, gear oil, or motor oil.

5. The oil composition of claim 1 further comprising detergents, anti-foaming agents, viscosity index improvers, and anti-corrosion agents.

6. The oil composition of claim 1 wherein said acrylic block copolymer comprises a homopolymer of a $C_{12}$ or lower alkyl meth(acrylate) or acrylate segment.

7. The oil composition of claim 1 wherein said acrylic block copolymer comprises a poly lauryl acrylate or methacrylate segment.

* * * * *